United States Patent
Weitzel et al.

(10) Patent No.: US 8,119,708 B2
(45) Date of Patent: Feb. 21, 2012

(54) METHOD FOR THE PRODUCTION OF PROTECTIVE COLLOID-STABILIZED POLYMER PRODUCTS AND DEVICE FOR CARRYING OUT THE METHOD

(75) Inventors: Hans-Peter Weitzel, Reischach (DE); Mehmet Gunaltay, Emmerting (DE); Manfred Selig, Burghausen (DE)

(73) Assignee: Wacker Chemie AG, Munich (DE)

( * ) Notice: Subject to any disclaimer, the term of this patent is extended or adjusted under 35 U.S.C. 154(b) by 224 days.

(21) Appl. No.: 12/675,052

(22) PCT Filed: Aug. 11, 2008

(86) PCT No.: PCT/EP2008/060503
§ 371 (c)(1), (2), (4) Date: Feb. 24, 2010

(87) PCT Pub. No.: WO2009/027212
PCT Pub. Date: Mar. 5, 2009

(65) Prior Publication Data
US 2011/0112218 A1    May 12, 2011

(30) Foreign Application Priority Data
Aug. 29, 2007   (DE) .................. 10 2007 040 850

(51) Int. Cl.
*C08G 18/08* (2006.01)
(52) U.S. Cl. ........................................ 523/343
(58) Field of Classification Search .......... 523/343
See application file for complete search history.

(56) References Cited

U.S. PATENT DOCUMENTS

| | | | |
|---|---|---|---|
| 5,602,216 | A | 2/1997 | Juvet |
| 6,660,814 | B1 | 12/2003 | Kroner |
| 2001/0012235 | A1 | 8/2001 | Schuchardt |
| 2002/0035192 | A1 | 3/2002 | Weitzel |
| 2004/0048969 | A1 | 3/2004 | Kirsch et al. |
| 2004/0085853 | A1 | 5/2004 | Kohlgruber et al. |
| 2005/0261423 | A1 | 11/2005 | Funkhauser et al. |
| 2005/0276159 | A1 | 12/2005 | Kastenhuber et al. |

FOREIGN PATENT DOCUMENTS

| | | |
|---|---|---|
| CN | 1184819 A | 6/1998 |
| DE | 19940399 | 3/2001 |
| EP | 0526741 | 2/1993 |
| EP | 0608567 | 8/1994 |
| EP | 0755945 | 1/1997 |
| EP | 0834518 | 4/1998 |
| EP | 1067147 | 1/2001 |
| EP | 1174445 | 1/2002 |
| EP | 1384502 | 1/2004 |
| WO | WO 00/71319 | 11/2000 |
| WO | WO 02/059158 | 8/2002 |
| WO | WO 03/006510 | 1/2003 |
| WO | WO 2009/021930 | 2/2009 |

OTHER PUBLICATIONS

Fox, T. G.; #J5—"Influence of Diluent and of Copolymer Composition on the Glass Temperature of a Polymer System"; Bulletin American Physics Society; vol. 1; 1956; p. 123 (1 p).
Lee, W. A. & Rutherford, R. A.; "The Glass Transition Temperatures of Polymers"; Polymer Handbook, 2$^{nd}$ Edition; 1975; 53 pp.; J. Wiley & Sons, New York.
Gold, Josef; "International Search Report"; Nov. 25, 2008; 2 pp; European Patent Office, Rijswijk, The Netherlands.
EPO Office Action Jul. 16, 2010.

*Primary Examiner* — Edward Cain
(74) *Attorney, Agent, or Firm* — RatnerPrestia

(57) ABSTRACT

The invention relates to a method for the production of protective colloid-stabilized polymer products by means of emulsion polymerization in a reactor having an external cooling circuit, which is equipped with a pump and a heat exchanger, characterized in that the reaction mixture present in the reactor is delivered to a cooled static mixer-heat exchanger having stationary fixtures and is subsequently returned to the reactor. The invention further relates to a device for the production of protective colloid-stabilized polymer products by means of emulsion polymerization, comprising a reactor and an external cooling circuit, characterized in that the external cooling circuit is equipped with a pump and a cooled static mixer-heat exchanger having stationary fixtures.

13 Claims, 1 Drawing Sheet

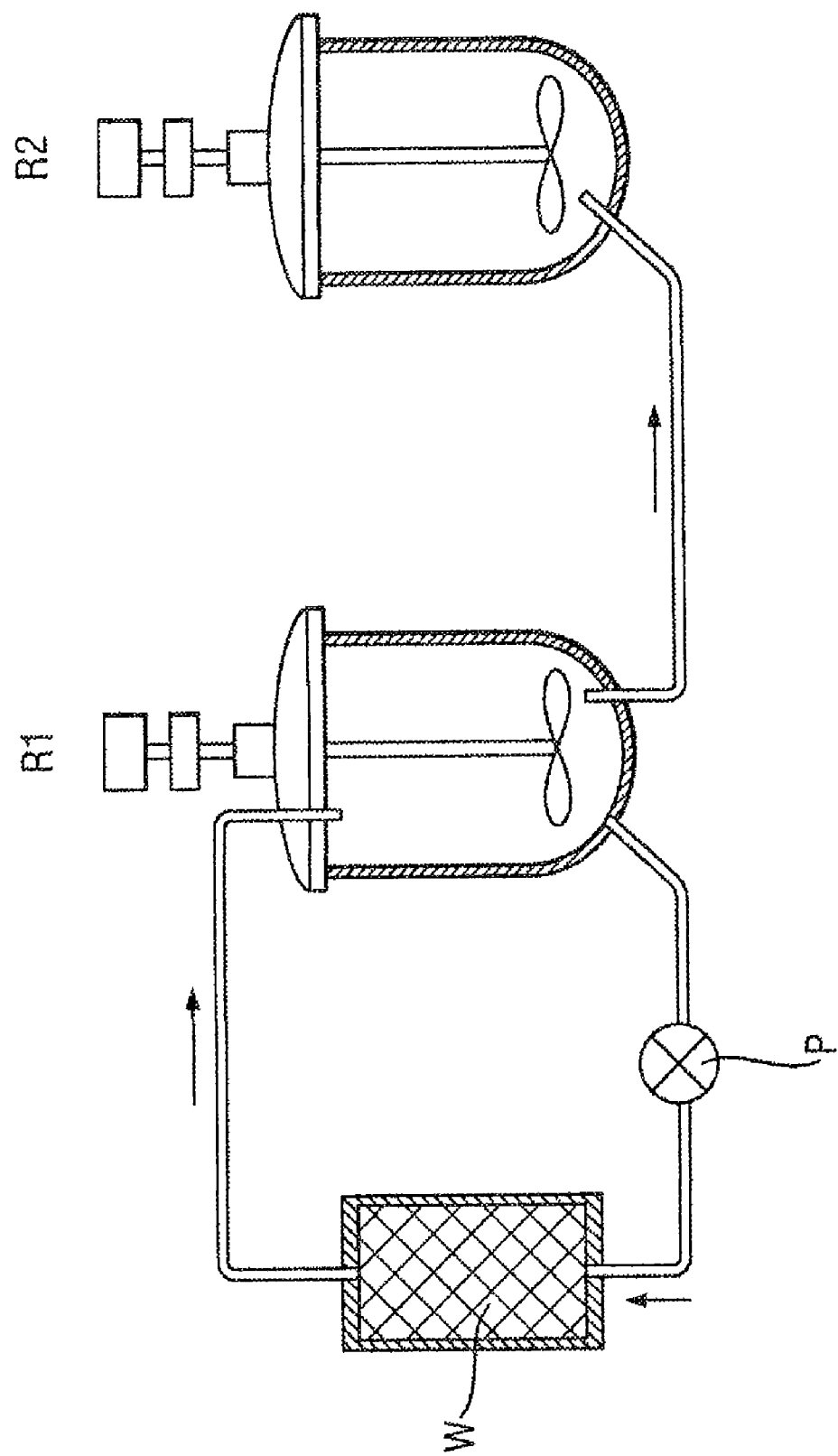

METHOD FOR THE PRODUCTION OF PROTECTIVE COLLOID-STABILIZED POLYMER PRODUCTS AND DEVICE FOR CARRYING OUT THE METHOD

CROSS REFERENCE TO RELATED APPLICATIONS

This application is the National Phase filing of PCT application number EP/2008/060503, filed 11 Aug. 2008, and claims priority of German patent application number DE102007040850.3, filed 29 Aug. 2007, the entire disclosures of which applications are incorporated herein by reference.

FIELD OF THE INVENTION

The invention relates to a process for producing protective-colloid-stabilized polymers by means of emulsion polymerization in a reactor with an external cooling circuit which has a pump and has a heat exchanger.

BACKGROUND OF THE INVENTION

Protective-colloid-stabilized polymers are used especially in the form of their aqueous dispersions or water-redispersible polymer powders in a wide variety of applications, for example as coating compositions or adhesives, for a very wide variety of substrates. The protective colloids used generally comprise polyvinyl alcohols. The use of polyvinyl alcohol is desirable because, in contrast to systems stabilized by low-molecular-weight compounds (emulsifiers), this material itself contributes to strength (e.g. tensile bond strength values in tile adhesives). Preferred monomers for producing redispersible powders have hitherto been vinyl esters and ethylene, since it is not easy to achieve stabilization of acrylate copolymers or styrene acrylate copolymers using polyvinyl alcohol.

The traditional production of said dispersions uses a batch emulsion polymerization process. This procedure features high flexibility and is therefore preferred in plants with a wide variety of products.

A disadvantage is that the large amounts of energy generated during the polymerization reaction cannot be adequately dissipated by cooling assemblies internal to the reactor. Cooling assemblies internal to the reactor are generally a jacket within which coolant flows around the reactor, or cooling coils attached on the inner wall of the reactor. The result of the limited amount of heat dissipation that said equipment can provide is sometimes very long process times, which adversely affect the economics of the process. A known method of improving heat dissipation and accelerating the process is to conduct the polymerization in such a way that the polymerizing medium is introduced via a circuit to an external cooler, from where it is returned to the reactor.

EP 0 834 518 A1 describes a process for producing polymer dispersions by means of emulsion polymerization and dissipating the heat of polymerization by way of an external cooler, characterized by use of a heat exchanger with a substantially laminar flow profile, and of a low-shear pump. The presence of laminar flow is particularly emphasized and serves to minimize the effect of shear forces. WO 03/006510 A2 describes a similar process, except that there is specific recommendation of tubular diaphragm pumps that provide low-shear conveying action. WO 02/059158 A1 describes a process where a portion of the monomer is introduced directly into the external circuit. This is intended to help reduce formation of coagulate and of deposit on the wall. EP 0 608 567 A1 relates to a process for polymerizing vinyl chloride in a reactor with an external cooling circuit which has been equipped with heat exchanger and with a pump, where the pump used comprises a Hidrostal pump with screw centrifugal impeller. EP 0 526 741 A2 discloses a reactor system which has an external cooling circuit and which is characterized by a specific pump, with an impeller in the form of a spiral screw blade. DE 199 40 399 recommends using an impeller pump to convey the polymer dispersions in the cooling circuit.

EP 1174445 A1 describes continuous emulsion polymerization in at least two pressure reactors arranged in series and subsequently in at least one unpressurized reactor, this polymerization being initiated by means of a redox system, and at least some of the reduction component being introduced in the first pressure reactor. EP 1067147 A2 describes a continuous process for emulsion polymerization in which a low-molecular-weight polyvinyl alcohol is used as protective colloid. EP 1384502 A1 discloses a static mixer-heat exchanger which encompasses a housing and, arranged therein, tubes which are supplied with heat-transfer medium, where the tubes have connecting fillets which bring about the static mixing effect when a substrate is passed through the housing. US 2001/0012235 A1 describes a static mixer made of an enclosing housing and of a mixer insert, where the mixer insert is composed of a large number of interlocking grids. EP 0755945 A1 describes an apparatus which encompasses a tubular reactor and a circuit for the partial return of polymerization product. There are two mixer-heat exchangers arranged within the circuit: one on the outgoing side, which heats the polymerization product, and one on the ingoing side, which in turn cools the polymerization product. WO 00/71319 A1 describes an apparatus in which product is removed from a reactor and introduced into an extruder, where, in the section between reactor and extruder, the product is cooled in heat exchangers arranged in series.

A disadvantage is that if the dimensions of conventional heat exchangers (plate heat exchangers, tube-bundle heat exchangers, spiral heat exchangers) are kept within reasonable limits they have only limited heat-dissipation capacity. One of the reasons for this is that the dispersions to be cooled give only laminar flow. To achieve tolerable cooling rates it therefore necessary to pump material through the external circuit with very high flow rates. The high-performance pumps necessary for this can cause enormous damage to the product, by introducing energy into the medium.

It was an object of the present invention to provide a more efficient process for heat dissipation during emulsion polymerization reactions, without any adverse effect on the properties of the product.

SUMMARY OF THE INVENTION

The invention provides a process for producing protective-colloid-stabilized polymers by means of emulsion polymerization in a reactor with an external cooling circuit which has a pump and has a heat exchanger, characterized in that the reaction mixture located in the reactor is conveyed by means of a pump into a cooled static mixer-heat exchanger with fixed internals, and is then returned to the reactor.

An apparatus for producing protective-colloid-stabilized polymers by means of emulsion polymerization, encompassing a reactor and an external cooling circuit, characterized in that the external cooling circuit has a pump and has a cooled static mixer-heat exchanger with fixed internals, is suitable for carrying out the process.

BRIEF DESCRIPTION OF THE DRAWING

FIG. 1 is a schematic representation of an exemplary reactor according to the invention.

DETAILED DESCRIPTION OF THE INVENTION

Suitable reactors are appropriately dimensioned steel reactors, which may be designed as pressure reactors or as unpressurized reactors, and which have the conventional agitator equipment, heating and cooling systems, measurement and control equipment, and also lines for introducing the starting materials and for discharging the products.

The external cooling circuit is composed of an appropriately dimensioned pipeline with integrated pump and heat exchanger. The location of the connection for withdrawing the polymerization mixture into the external cooling circuit is normally within the lower third of the reactor, preferably at the base of the reactor. The location of the connection for returning the polymerization mixture from the external cooling circuit into the reactor is a site that differs from that of the connection for withdrawing the mixture, generally being in the upper third of the reactor, preferably at the top of the reactor.

The type of pump used is not critical. Examples of suitable pumps are non-chokeable pumps (vortex) or displacement pumps. Preference is given to displacement pumps, and particular preference is given to screw pumps. The dimensioning of the pump is preferably such that it withstands a pressure of up to 100 bar, preferably from 40 to 100 bar. The throughput per hour depends on the dimensioning of the reactor. The design of the external cooling circuit is generally such that the flow rate (throughput per hour) is at least twice the reactor volume per hour, preferably from 3 to 10 times the reactor volume per hour, and most preferably from 4 to 6 times the reactor volume per hour. Usual values are in the range from 50 to 400 m$^3$/h, preferably from 150 to 300 m$^3$/h.

The static mixer generally encompasses a tubular casing equipped with at least one mixing insert arranged therein, for example in the form of one or more plates having fillets and having slits. In each case here, the fillets of one of the plates extend in crisscross fashion through the slits of the other plate. A preferred arrangement has the plates inclined with respect to one another and with respect to the axis of the tube. The tubular casing can be equipped with a jacket for cooling purposes. The flow tube equipped with the mixing elements can, as an alternative to this, or in addition, also be equipped with an internally arranged tube bundle for cooling purposes. Suitable static mixer-heat exchangers are available commercially, examples being Fluidec CES-XR products.

The dimensioning of the static mixer-heat exchanger depends substantially on the size of the polymerization reactor. The cooling rate should generally be $\geq 50$ kW/m$^3$ of reactor volume. The cooling rate should preferably be $\geq 75$ kW/m$^3$ of reactor volume, particularly preferably from 75 to 100 kW/m$^3$ of reactor volume.

A feature of the static mixer-heat exchanger is that the mixer internals provide crossmixing and continuous surface-renewal. This gives very good heat transfer, in particular for laminar flows. It is surprising that, despite the internals, no damage to the product or coagulation of the polymer dispersion is observed. Heat dissipation is considerably better in comparison with simple tube-bundle heat exchangers, thus permitting a markedly more compact design of the cooler, this being an important issue for large industrial plants.

The process for producing protective-colloid-stabilized polymers by means of emulsion polymerization can polymerize any desired ethylenically unsaturated monomers in an aqueous medium in the presence of any desired protective colloids, after free-radical initiation. The ethylenically unsaturated monomers used generally comprise one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes, and vinyl halides. It is preferable that the process is used for polymerizing vinyl ester, preferably in the presence of ethylene and, if appropriate, further comonomers.

Suitable vinyl esters are those of carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 11 carbon atoms, for example VeoVa9$^R$ or VeoVa10$^R$ (Hexion trademarks). Vinyl acetate is particularly preferred. The amount generally polymerized of the above-mentioned vinyl esters is from 30 to 100% by weight, preferably from 30 to 90% by weight, based in each case on the total weight of the monomers.

The amount of ethylene generally copolymerized is from 1 to 40% by weight, based on the total weight of the monomers.

Suitable further comonomers are those from the group of the esters of acrylic acid or methacrylic acid, of the vinyl halides, such as vinyl chloride, and of the olefins, such as propylene. Suitable methacrylic esters or acrylic esters are esters of unbranched or branched alcohols having from 1 to 15 carbon atoms, e.g. methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate, and 2-ethylhexyl acrylate. The amount copolymerized of these comonomers, if appropriate, is from 1 to 40% by weight, based on the total weight of the monomers.

It is also possible, if appropriate, to copolymerize from 0.05 to 10% by weight, based on the total weight of the monomer mixture, of auxiliary monomers. Examples of auxiliary monomers are ethylenically unsaturated mono- and dicarboxylic acids, preferably acrylic acid, methacrylic acid, fumaric acid, and maleic acid; ethylenically unsaturated carboxamides and ethylenically unsaturated carbonitriles, preferably acrylamide and acrylonitrile; mono- and diesters of fumaric acid and maleic acid, e.g. the diethyl and diisopropyl esters, and also maleic anhydride, ethylenically unsaturated sulfonic acids and salts of these, preferably vinylsulfonic acid, 2-acrylamido-2-methylpropanesulfonic acid. Further examples are precrosslinking comonomers, e.g. ethylenically poly-unsaturated comonomers, examples being divinyl adipate, diallyl maleate, allyl methacrylate, or triallyl cyanurate, or postcrosslinking comonomers, for example acrylamidoglycolic acid (AGA), methyl methylacrylamido-glycolate (MAGME), N-methylolacrylamide (NMA), N-methylolmethacrylamide (NMMA), allyl N-methylol-carbamate, alkyl ethers, such as the isobutoxy ether, or esters, of N-methylolacrylamide, of N-methylolmeth-acrylamide, and of allyl N-methylolcarbamate. Other suitable compounds are epoxy-functional comonomers, such as glycidyl methacrylate and glycidyl acrylate. Further examples are silicon-functional comonomers, such as acryloxypropyltri(alkoxy)- and methacryloxy-propyltri(alkoxy)silanes, vinyltrialkoxysilanes, and vinylmethyldialkoxysilanes, where the alkoxy groups present can for example be methoxy, ethoxy, and ethoxypropylene glycol ether moieties. Mention may also be made of monomers having hydroxy groups or having CO groups, examples being hydroxyalkyl esters of methacrylic acid and of acrylic acid, e.g. hydroxyethyl, hydroxypropyl, or hydroxybutyl acrylate or the corresponding methacrylate, and also compounds such as diacetoneacrylamide and acetylacetoxyethyl acrylate or the corresponding methacrylate.

Preference is given to comonomer mixtures of vinyl acetate with from 1 to 40% by weight of ethylene; and also comonomer mixtures of vinyl acetate with from 1 to 40% by weight of ethylene and from 1 to 50% by weight of one or more further comonomers from the group of vinyl esters having from 1 to 15 carbon atoms in the carboxylic acid moiety, e.g. vinyl propionate, vinyl laurate, vinyl esters of alpha-branched carboxylic acids having from 9 to 11 carbon atoms, e.g. VeoVa9, VeoVa10, VeoVa11; and mixtures of vinyl acetate, from 1 to 40% by weight of ethylene and preferably from 1 to 60% by weight of acrylic ester of unbranched or branched alcohols having from 1 to 15 carbon atoms, in particular n-butyl acrylate, or 2-ethylhexyl acrylate; and mixtures with from 30 to 75% by weight of vinyl acetate, from 1 to 30% by weight of vinyl laurate, or vinyl ester of an alpha-branched carboxylic acid having from 9 to 11 carbon atoms, and also from 1 to 30% by weight of acrylic ester of unbranched or branched alcohols having from 1 to 15 carbon atoms, in particular n-butyl acrylate or 2-ethylhexyl acrylate, where these also comprise from 1 to 40% by weight of ethylene;

and also mixtures with vinyl acetate, from 1 to 40% by weight of ethylene, and from 1 to 60% by weight of vinyl chloride; where the mixtures can also comprise the above-mentioned amounts of the abovementioned auxiliary monomers, and the % by weight data always give a total of 100% by weight.

The selection of the monomers or the selection of the proportions by weight of the comonomers here is always made in such a way that the resultant glass transition temperature Tg is generally from −50° C. to +50° C. The glass transition temperature Tg of the polymers can be determined in a known manner by means of differential scanning calorimetry (DSC). Tg can also be approximated by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by wt./100) of the monomer n and $Tg_n$ is the glass transition temperature in Kelvin of the homopolymer of the monomer n. Tg values for homopolymers are listed in Polymer Handbook 2nd Edition, J. Wiley & Sons, New York (1975).

The polymerization temperature is generally from 40° C. to 100° C., preferably from 60° C. to 90° C. The polymerization reaction is initiated with the redox-initiator combinations that are commonly used for emulsion polymerization reactions. Examples of suitable oxidation initiators are the sodium, potassium, and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, and azobisisobutyronitrile. Preference is given to the sodium, potassium, and ammonium salts of peroxodisulfuric acid, and hydrogen peroxide. The amount generally used of the abovementioned initiators is from 0.01 to 2.0% by weight, based on the total weight of the monomers.

Suitable reducing agents are the sulfites and bisulfites of the alkali metals and of ammonium, for example sodium sulfite, the derivatives of sulfoxylic acid, e.g. zinc or alkali metal formaldehyde-sulfoxylates, such as sodium hydroxymethanesulfinate (Bruggolite), and (iso)ascorbic acid. Preference is given to sodium hydroxymethanesulfinate and (iso)ascorbic acid. The amount of reducing agent is preferably from 0.015 to 3% by weight, based on the total weight of the monomers.

The abovementioned oxidants, in particular the salts of peroxodisulfuric acid, can also be used alone as thermal initiators.

For control of molecular weight, regulating substances can be used during the polymerization reaction. If regulators are used, the amounts usually used of these are from 0.01 to 5.0% by weight, based on the monomers to be polymerized, and the regulators are fed separately or else after premixing with components of the reaction. Examples of substances of this type are n-dodecyl mercaptan, tert-dodecyl mercaptan, mercaptopropionic acid, methyl mercaptopropionate, isopropanol, and acetaldehyde. It is preferable not to use any regulating substances.

Suitable protective colloids are completely hydrolyzed or partially hydrolyzed polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl, and hydroxypropyl derivatives; proteins, such as casein or caseinate, soy protein, gelatin; lignosulfonates; synthetic polymers, such as poly(meth)acrylic acid, copolymers of (meth)acrylates with carboxy-functional comonomer units, poly(meth)-acrylamide, polyvinylsulfonic acids and their water-soluble copolymers; melamine-formaldehydesulfonates, naphthalene formaldehydesulfonates, styrene-maleic acid copolymers and vinyl ether-maleic acid copolymers.

Preferred protective colloids are partially hydrolyzed or completely hydrolyzed polyvinyl alcohols. Preference is given to partially hydrolyzed polyvinyl alcohols with a degree of hydrolysis of from 80 to 95 mol % and with Höppler viscosity of from 1 to 30 mPas in 4% strength aqueous solution (Höppler method at 20° C., DIN 53015). Preference is also given to partially hydrolyzed, hydrophobically modified polyvinyl alcohols with a degree of hydrolysis of from 80 to 95 mol % and with Höppler viscosity of from 1 to 30 mPas in 4% strength aqueous solution. Examples of these are partially hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers, such as vinyl butyl ether, and olefins, such as ethene and decene. The proportion of the hydrophobic units is preferably from 0.1 to 10% by weight, based on the total weight of the partially hydrolyzed polyvinyl alcohol. It is also possible to use mixtures of the abovementioned polyvinyl alcohols.

Other preferred polyvinyl alcohols are partially hydrolyzed, hydrophobized polyvinyl alcohols which are obtained via polymer-analogous reaction, for example acetalization, of the vinyl alcohol units with $C_1$-$C_4$ aldehydes, such as butyraldehyde. The proportion of the hydrophobic units is preferably from 0.1 to 10% by weight, based on the total weight of the partially hydrolyzed polyvinyl acetate. The degree of hydrolysis is from 80 to 95 mol %, preferably from 85 to 94 mol %, Höppler viscosity (DIN 53015, Höppler method, 4% strength aqueous solution) being from 1 to 30 mPas, preferably from 2 to 25 mPas.

Most preference is given to polyvinyl alcohols with a degree of hydrolysis of from 85 to 94 mol % and with Höppler viscosity of from 3 to 15 mPas in 4% strength aqueous solution (Höppler method at 20° C., DIN 53015). The abovementioned protective colloids are obtainable by means of processes known to the person skilled in the art.

The total amount generally added of the polyvinyl alcohols during the polymerization reaction is from 1 to 20% by weight, based on the total weight of the monomers.

The process of the invention preferably carries out a polymerization reaction without addition of emulsifiers. In exceptional cases it can also be advantageous to use small amounts of emulsifiers, if appropriate from 1 to 5% by weight, based on the amount of monomer. Suitable emulsifiers are either anionic, cationic, or nonionic emulsifiers, examples being anionic surfactants, such as alkyl sulfates having a chain length of from 8 to 18 carbon atoms, alkyl or alkylaryl ether sulfates having from 8 to 18 carbon atoms in the hydrophobic moiety and up to 40 ethylene or propylene oxide units, alkyl- or alkylarylsulfonates having from 8 to 18 carbon atoms, esters and monoesters of sulfosuccinic acid with monohydric alcohols or alkylphenols, or nonionic surfactants, such as alkyl polyglycol ether or alkylaryl polyglycol ether having from 8 to 40 ethylene oxide units.

All of the monomers can be used as initial charge in the reactor, or the monomers can be added to the mixture. The preferred procedure uses from 50 to 100% by weight, in particular more than 70% by weight, based on the total weight, of the monomers as initial charge and adds the remainder to the mixture. The materials can be added separately (spatially and chrono-logically), or some or all of the components to be added can be added in preemulsified form.

The content of protective colloid in the reactor can be used entirely as an initial charge, or else some of this content can be added. It is preferable to use at least 70% by weight of the protective colloid as an initial charge, and it is particularly preferable that the content of protective colloid is entirely used as an initial charge.

The polymerization reaction is preferably initiated with a redox system made of oxidation component and reduction component. Monomer conversion is controlled by addition of the initiator. The manner of adding the entirety of the initiators into the reactor is such as to ensure that the polymerization reaction is continuous.

Once the polymerization reaction in the reactor has been concluded, postpolymerization can be carried out by using known methods in an unpressurized reactor to remove residual monomers, the general method being redox-catalyst-initiated postpolymerization. The amounts of the two initiator components necessary for the finishing process are therefore added within the unpressurized reactors. It is also possible to remove volatile residual monomers by means of distillation, preferably under reduced pressure, and, if appropriate, with passage of, or flushing by, inert entrainer gases, such as air, nitrogen, or steam.

The solids content of the aqueous dispersions obtainable by the process of the invention is from 30 to 75% by weight, preferably from 50 to 60% by weight. For production of water-redispersible polymer powders, the aqueous dispersions can be dried, for example by means of fluidized-bed drying, freeze drying, or spray drying, if appropriate after addition of protective colloids as drying aid. It is preferable that the dispersions are spray-dried. The spray-drying here takes place in conventional spray-drying plants, and the atomization process here may use single-, twin-, or multifluid nozzles, or may use a rotating disk. The discharge temperature is generally selected here within the range from 45° C. to 120° C., preferably from 60° C. to 90° C., depending on the plant, resin Tg, and desired degree of drying.

The total amount generally used of the drying aid is from 3 to 30% by weight, based on the polymeric constituents of the dispersion. The total amount of protective colloid prior to the drying procedure is therefore to be at least 3 to 30% by weight, based on polymer content; it is preferable to use from 5 to 20% by weight, based on polymer content.

Suitable drying aids are partially hydrolyzed polyvinyl alcohols; polyvinylpyrrolidones; polyvinyl acetals; polysaccharides in water-soluble form, e.g. starches (amylose and amylopectin), celluloses and their carboxymethyl, methyl, hydroxyethyl, and hydroxypropyl derivatives; proteins, such as casein or caseinate, soy protein, gelatin; lignosulfonates; synthetic polymers, such as poly(meth)acrylic acid, copolymers of (meth)acrylates with carboxy-functional comonomer units, poly(meth)acrylamide, polyvinylsulfonic acids and their water-soluble copolymers; melamine-formaldehydesulfonates, naphthalene formaldehyde-sulfonates, styrene-maleic acid copolymers and vinyl ether-maleic acid copolymers. It is preferable that no protective colloids other than polyvinyl alcohols are used as drying aid.

A content of up to 1.5% by weight of antifoam, based on the base polymer, has proven advantageous in the spraying process. The resultant powder can be equipped with an antiblocking agent (anticaking agent), preferably up to 30% by weight, based on the total weight of polymeric constituents, in order to increase shelf life by improving resistance to blocking, in particular in the case of powders with low glass transition temperature. Examples of antiblocking agents are Ca carbonate and Mg carbonate, talc, calcium sulfate, silica, kaolins, and silicates, with particle sizes preferably in the range from 10 nm to 10 μm.

The viscosity of the feed to be sprayed is adjusted by way of the solids content in such a way as to give a value of <500 mPas (Brookfield viscosity at 20 revolutions and 23° C.), preferably <250 mPas. The solids content of the dispersion for spraying is >35%, preferably >40%.

To improve performance characteristics, further materials may be added during the spraying process. Examples of further constituents present in preferred embodiments of dispersion powder compositions are pigments, fillers, foam stabilizers, and hydrophobizers.

The aqueous polymer dispersions and the water-redispersible, protective-colloid-stabilized polymer powders can be used in the application sectors typical therefor, for example in construction-chemistry products, if appropriate in conjunction with hydraulically setting binders, such as cements (Portland cement, alumina cement, pozzolanic cement, slag cement, magnesia cement, phosphate cement), gypsum plaster, and water glass, or for the production of construction adhesives, in particular tile adhesives and exterior-insulation-system adhesives, renders, troweling compounds, floor-filling compositions, leveling compositions, sealing slurries, or jointing mortar, and in paints. They can also be used as binders for coating compositions and adhesives, or as coating compositions or binders for textiles and paper.

The examples below serve for further explanation of the invention:

FIG. 1 shows the reactor system for the inventive example below, encompassing a pressure reactor R1 and a heat exchanger W. The heat exchanger is a Fluitec CSE-XR heat exchanger with overall length 1.60 m; the volume of the heat exchanger W is therefore about 22 liters. The reactor R1 has a volume of about 590 liters, and has a stirrer and a coolable jacket. The pump P is an eccentric screw pump. All of the apparatuses have been designed for use in the pressure range up to 80 bar. Posttreatment takes place in an unpressurized reactor R2.

Inventive Example 120 kg of deionized water, 92 kg of a 20% strength solution of a polyvinyl alcohol with a degree of hydrolysis of 88 mol % and Höppler viscosity of 4 mPas, and also 236 kg of vinyl acetate, and 19 kg of ethylene are used as initial charge in the pressure reactor R1.

The pH was adjusted to 4.0 with 140 g of formic acid, and the mixture was heated to 55° C. after addition of 50 ml of 10% strength ammonium iron sulfate.

Once the setpoint temperature had been reached, the addition of initiator was begun, at 750 g/h:
oxidant: 3% strength solution of tert-butyl hydroperoxide
reducing agent: 5% strength solution of sodium hydroxymethanesulfinate (Bruggolite)

As the polymerization reaction began, the contents of the reactor were pumped at a rate of 3 m³/h through the external circuit. At the same time, the internal temperature was controlled to a stable 85° C.

30 minutes after the start of the reaction, a further 59 kg of vinyl acetate were added, as also were 29 kg of a 20% strength solution of a polyvinyl alcohol with a degree of hydrolysis of 88 mol % and Höppler viscosity of 4 mPas, within a period of one hour. 15 kg of ethylene were also then added at 44 bar. After 120 minutes of running time, the polymerization reaction had ended, and the reaction mixture was depressurized into an unpressurized reactor R2, and excess ethylene was removed. Residual monomer content was reduced by adding 2.2 kg of 10% strength tert-butyl hydroperoxide and 4.4 kg of 5% strength sodium hydroxymethanesulfinate (Bruggolite).

This gave a dispersion with solids content of 57.5%, viscosity of 1480 mPas (Brookfield 20 at 23° C.), pH of 3.4, Tg of +16° C., and particle diameter Dw of 1120 nm. The amount of free residual monomer was 150 ppm.

No significant adverse effect on product quality was observed.

Sieve residue on sieving through 250 μm was 180 ppm (mg/kg). The dispersion was stable in the cement.

Heat dissipation by way of the heat exchanger was about 40 kW. No significant deposit was observed to form on the wall within the heat exchanger.

Comparative Example

The procedure was as in inventive example 1, except that the heat exchanger used comprised a traditional tubular heat exchanger with comparable volume. The heat-dissipation rate, about 25 kW, was only about 60% of that of the heat exchanger used in the invention. The polymerization time was longer: 155 minutes. There was a tendency toward marked formation of deposit on the wall of the tubular heat exchanger during the course of its period of use (usually up to 50 batches), with a corresponding reduction in cooling rate.

What is claimed is:

1. A process for producing a protective-colloid-stabilized polymer, comprising emulsion polymerization of monomers in a reaction mixture to form an aqueous polymer dispersion, wherein the polymerization is performed in a reactor with an external cooling circuit which has a pump and has a heat exchanger and wherein reaction mixture in the reactor is conveyed by means of a pump into a cooled static mixer-heat exchanger with fixed internals, and is then returned to the reactor.

2. The process as claimed in claim 1, wherein the external cooling circuit is dimensioned in such a way as to have a flow rate that is at least twice the reactor volume per hour.

3. The process as claimed in claim 1 wherein the static mixer-heat exchanger is dimensioned in such a way that its cooling rate is $\geq 50$ kW/m³ of reactor volume.

4. The process as claimed in claim 1 wherein the monomers comprise one or more ethylenically unsaturated monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes, and vinyl halides.

5. The process as claimed in claim 1 wherein the monomers comprise ethylene and one or more vinyl esters of unbranched or branched alkylcarboxylic acids having from 1 to 15 carbon atoms.

6. The process as claimed in claim 1, wherein the monomers comprise one or more vinyl esters of unbranched or branched alkylcarboxylic acids having from 1 to 15 carbon atoms, in an amount of from 30 to 90% by weight, and ethylene in an amount of from 1 to 40% by weight, based in each case on the total weight of the monomers.

7. The process as claimed in claim 1, wherein the polymerization is carried out in the presence of partially hydrolyzed or completely hydrolyzed polyvinyl alcohol as protective colloid.

8. The process as claimed in claim 1, further comprising drying the aqueous polymer dispersion to give a water-redispersible polymer powder.

9. The process as claimed in claim 6, wherein the polymerization is carried out in the presence of partially hydrolyzed or completely hydrolyzed polyvinyl alcohol as protective colloid.

10. The process as claimed in claim 6, further comprising drying the aqueous polymer dispersion to give a water-redispersible polymer powder.

11. The process as claimed in claim 6, wherein the monomers further comprise one or more additional monomers selected from the group consisting of esters of acrylic acid or methacrylic acid, vinyl halides, and olefins other than ethylene.

12. The process as claimed in claim 11, wherein the polymerization is carried out in the presence of partially hydrolyzed or completely hydrolyzed polyvinyl alcohol as protective colloid.

13. The process as claimed in claim 11, further comprising drying the aqueous polymer dispersion to give a water-redispersible polymer powder.

* * * * *